US012768958B2

(12) United States Patent
Finkelstein

(10) Patent No.: US 12,768,958 B2
(45) Date of Patent: Oct. 20, 2026

(54) SYSTEMS AND METHODS FOR HIGH PRECISION DIRECT TIME-OF-FLIGHT LIDAR IN THE PRESENCE OF STRONG PILE-UP

(71) Applicant: AEYE, Inc., Dublin, CA (US)

(72) Inventor: Hod Finkelstein, Albany, CA (US)

(73) Assignee: AEye, Inc., Pleasanton, CA (US)

(*) Notice: Subject to any disclaimer, the term of this patent is extended or adjusted under 35 U.S.C. 154(b) by 807 days.

(21) Appl. No.: 18/157,125

(22) Filed: Jan. 20, 2023

(65) Prior Publication Data

US 2023/0236297 A1 Jul. 27, 2023

Related U.S. Application Data

(63) Continuation of application No. PCT/US2023/011100, filed on Jan. 19, 2023.

(60) Provisional application No. 63/301,631, filed on Jan. 21, 2022.

(51) Int. Cl.

*G01S 7/48* (2006.01)
*G01S 7/4863* (2020.01)
*G01S 7/4865* (2020.01)

(52) U.S. Cl.

CPC .......... *G01S 7/4865* (2013.01); *G01S 7/4863* (2013.01)

(58) Field of Classification Search

None

See application file for complete search history.

(56) References Cited

U.S. PATENT DOCUMENTS

| | | | |
|---|---|---|---|
| 2004/0160604 A1 | 8/2004 | Meeks et al. | |
| 2013/0070132 A1 | 3/2013 | Lehmann et al. | |
| 2013/0229541 A1 | 9/2013 | Webb | |
| 2020/0025887 A1 | 1/2020 | Dussan et al. | |
| 2021/0003679 A1 | 1/2021 | Dussan et al. | |

FOREIGN PATENT DOCUMENTS

EP 3370078 A1 * 9/2018 ............. G01S 17/10

OTHER PUBLICATIONS

International Application No. PCT/US2023/011100, International Preliminary Report on Patentability, dated Jul. 23, 2024, 7 pages.

(Continued)

*Primary Examiner* — Hovhannes Baghdasaryan
(74) *Attorney, Agent, or Firm* — Ahmann Kloke LLP

(57) ABSTRACT

Systems and methods are disclosed that employ a photodetector having a field of view. The photodetector generates signals indicative of photon detections in response to incident light over time. A circuit generates first histogram data and second histogram data in a memory based on the generated signals during first and second collection subframes of a frame respectively using first and second mappings of time to bins respectively, wherein the second mapping of time to bins for the second collection subframe exhibits shorter bin widths than the first mapping of time to bins for the first collection subframe. A range to a target in in the field of view is resolvable in the event of a pile-up condition for the photodetector based on (1) data indicative of a coarse range estimate derived from the first histogram data and (2) data indicative of a range adjustment derived from the second histogram data.

20 Claims, 7 Drawing Sheets

(56) References Cited

OTHER PUBLICATIONS

International Application No. PCT/US2023/011100, International Search Report and the Written Opinion, dated Jul. 6, 2023, 17 pages.
Tontini et al. "Numerical model of spad-based direct time-of-flight flash lidar CMOS image sensors." Sensors 20.18 (2020): 5203. Retrieved on May 22, 2023 (May 22, 2023) from.

* cited by examiner

SYSTEMS AND METHODS FOR HIGH PRECISION DIRECT TIME-OF-FLIGHT LIDAR IN THE PRESENCE OF STRONG PILE-UP

CROSS-REFERENCE AND PRIORITY CLAIM TO RELATED PATENT APPLICATIONS

This patent application is a continuation of PCT patent application PCT/US23/11100 designating the United States, filed Jan. 19, 2023, and entitled "Systems and Methods for High-Precision Direct Time-of-Flight Lidar in the Presence of Strong Pile-Up", which claims priority to U.S. provisional patent application 63/301,631, filed Jan. 21, 2022, and entitled "Systems and Methods for High Precision Direct Time-of-Flight Lidar in the Presence of Strong Pile-Up", the entire disclosures of each of which are incorporated herein by reference.

This patent application also claims priority to U.S. provisional patent application 63/301,631, filed Jan. 21, 2022, and entitled "Systems and Methods for High Precision Direct Time-of-Flight Lidar in the Presence of Strong Pile-Up", the entire disclosure of which is incorporated herein by reference.

INTRODUCTION

Many photodetectors such as single photon avalanche diodes (SPADs) will experience a dead time for a short duration after photon detection, where the SPAD will not detect new photons that are incident on the SPAD during the dead time duration. This characteristic of SPADs can lead to pixel pile-up when accumulating counts of photon detections in histogram bins over many laser cycles for the purpose of resolving range to target (e.g., see histogram 170 in FIG. 1C). For example, direct Time-of-Flight (dToF) lidars often use Time-Correlated Single-Photon Counting (TCSPC). This technique assumes that for a given laser cycle, the mean number of signal photon arrivals in response to a short laser pulse is much less than 1. Specifically, if the probability of 2 photons arriving within a dead time of a SPAD is not much lower than 1, then pile-up will occur.

Of special interest for lidar systems is pile-up resulting from specular reflectors, such as retroreflectors. In the case of diffuse reflectors, the received signal histogram may be approximated as the convolution between the laser pulse shape, atmospheric distortions (usually minor), the SPAD's jitter or temporal measurement uncertainty, and the bin width of a histogram. Some lidar systems utilize bin widths which are wider than the required resolution of the system, and then interpolate the peak position based on the above (or a look-up table which is based on a low detection probability).

In the case of a retroreflector, the assumption above (of a convolution) does not hold. The reason is that in a weak reflection, the probability for detecting a photon from any part of the laser pulse is uniform. However, when more than a single signal photon arrives within the dead time of the SPAD, only the first photon will be detected, this skewing the histogram towards its leading edge. At the extreme, only photons from the leading edge of the pulse will be detected and all the detections will "pile up" in one bin. Minor pile-up (skewing towards the leading edge) will result in minor error, and extreme pile-up will result in unacceptable range error, which equals the width of the whole bin. As used herein, a retroreflector refers to any strong reflector, whether diffuse, specular or a combination of the two that is capable of causing a pile-up condition in a sensor such as a lidar receiver.

For example, a system with a 2 ns bin width for histogram bins and a 2.5 ns laser pulse width will normally accumulate arrival events in 3 histogram bins, and the system can interpolate the signal position to within, for example, 0.3 nsec. However, in extreme pile-up, all arrivals may be collected in a single bin, resulting in a localization of the peak to within 2 ns, which may be unacceptably low resolution.

Some systems address pile-up by placing multiple SPADs per pixel such that more than one photon may be detected in response to a laser pulse, but this merely increases the dynamic range of the detector (at the severe cost of lower resolution) and does not make it possible to measure the range to a retroreflector with wide memory bins.

As a technical solution to this need the art, techniques are disclosed herein for resolving range to a target in a field of view of a pixel in the event of a pile-up condition for the pixel.

For example, a frame collection time for the pixel can be divided into a first collection subframe and a second collection subframe. The first collection subframe can serve as a diffuse acquisition phase, and the second collection subframe can serve as a retroreflector resolution phase, where the first collection subframe encompasses a first plurality of light pulse cycles, and where the second collection subframe encompasses a second plurality of light pulse cycles. Preferably, the first collection subframe encompasses more light pulse cycles than the second collection frame, but this need not be the case. Light pulses are transmitted into the field of view over the first and second pluralities of light pulse cycles.

For the first collection subframe, first histogram data is generated based on accumulated counts of time-referenced photon detections by the pixel during the first collection subframe in bins within a first set of bins according to a first bin map. For the second collection subframe, second histogram data is generated based on accumulated counts of time-referenced photon detections by the pixel during the second collection subframe in bins within a second set of bins according to a second bin map, where the second bin map exhibits shorter bin widths than the first bin map. In this fashion, the second mapping of time to bins will operate to cycle through bins for the second histogram data faster than the first mapping of time to bins cycles through bins for the first histogram data.

With this arrangement, the range to the target in in the field of view can be resolved in the event of the pile-up condition based on (1) data indicative of a coarse range estimate derived from the first histogram data and (2) data indicative of a range adjustment derived from the second histogram data. This allows an optical sensor to determine range to target with a high degree of resolution even if the target is sufficiently bright or reflective to cause pile-up conditions in one or more pixels of a pixel array.

Sensor systems and circuits are disclosed for implementing these techniques with respect to one or more pixels of a pixel array.

Using such techniques, optical sensors can employ hybrid dToF acquisition. For example, with an example embodiment:

- For sufficiently weak signals, the system and sensor can employ Time-Correlated Single-Photon Counting (TCSPC), using gross bins and histogram-peak-position interpolation.

For sufficiently strong signals, the system and sensor can employ memory-efficient fine histogram bins without gross-bin peak interpolation, in order to temporally localize the echo signal.

The innovative techniques described herein can be implemented in a manner that produces improved range for retroreflectors compared with traditional wide-bin histogramming methods, without spatial resolution penalty and with minor added electrical power.

Moreover, since the fine range calculations described herein need only be done in the case of pile-up, this technique does not add significant computational burden (unlike reported progressive-resolution schemes).

Further still, since heavy pile-up means a very high detection probability, only a relatively small number of laser cycles is needed for the retroreflector resolution phase, so the refresh rate (frame rate) is only marginally impacted; and only very few additional laser pulses are added—which means a minimal effect on the system's average power.

Moreover, for example embodiments where the retroreflector resolution part of the frame is always performed, there is no latency as would arise in conventional systems which first need to define whether and/or where pile-up happened, in which case the conventional systems then either reduce the emitter power or employ other timing schemes to improve retroreflector range measurements.

Since the inventive technique described herein does not require solving the pile-up (e.g., by reducing the emitter power), it can deal with highly-saturated scenarios. For example, a retroreflector may return a signal which is 1,000 times the saturation level of a sensor. Reducing the emitter power by 1,000 and collecting a non-piled-up TCSPC histogram will take many laser pulses (so a long time, and therefore significantly reduce frame rate), and such power reduction may not be possible because it may put the emitters in their subthreshold region. With the innovative techniques described herein, the need to reduce emitter power can be avoided.

These and other features and advantages of the invention will be described in greater detail below.

DETAILED DESCRIPTION OF EXAMPLE EMBODIMENTS

Figure 1A:
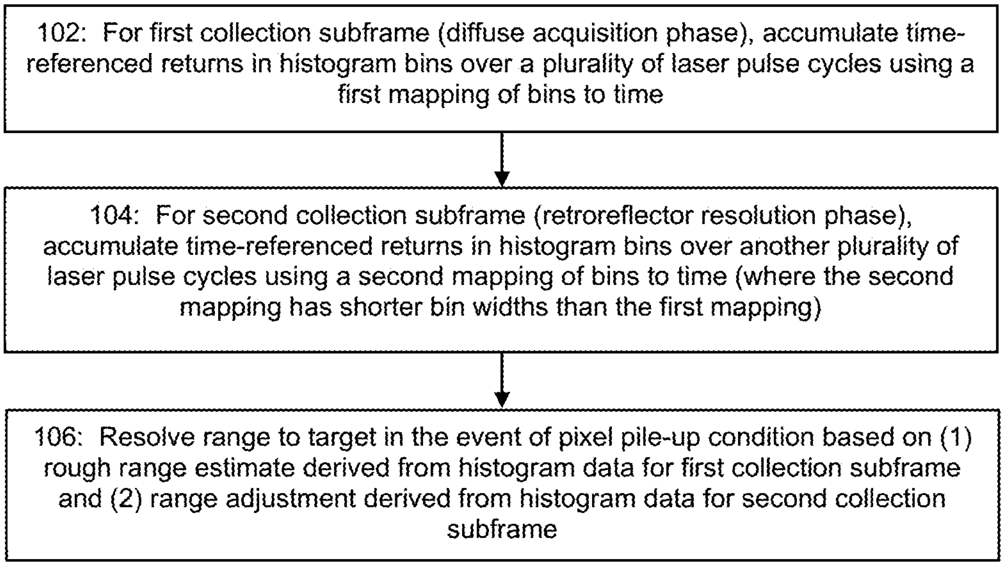
FIG. 1A shows an example process flow for resolving range to target in a manner that can handle pixel pile-up conditions.

FIG. 1A shows an example process flow for resolving range to target in a manner that can handle pixel pile-up conditions. This process flow can be performed for a lidar system on a frame-by-frame basis to determine ranges to targets in the field of view of the lidar system. The lidar system can include a lidar receiver, where the lidar receiver includes an array of pixels. Each pixel can comprise a photodetector that is looking at a particular part of the system's field of view. The FIG. 1A process flow can be performed for each pixel in the array to resolve ranges to the targets in pixels' respective fields of view.

A frame comprises a sufficiently large number of laser cycles to support reliable range-finding. For example, the number of laser cycles for a frame may be 1,050. However it should be understood that this is an example only, and a practitioner may choose to employ more of fewer laser cycles per frame. Furthermore, for an example, assume a laser pulse width of 2.5 ns and a nominal bin width of 2 ns (although it should be understood that a practitioner may choose to employ different values for pulse width and bin width). For this example, we expect an echo (return) to occupy a bin extent of 3 histogram bins (where a 2.5 pulse width falls completely within one of the bins, with leading/trailing edges spilling over into the adjacent bins). For this example, we will further assume that each pixel contains 100 memory bins for storing histogram values for a total of 200 ns temporal range (30 m range). Alternately, as described in (1) U.S. provisional patent application 63/291,387, filed Dec. 18, 2021, and entitled "Methods and Systems for Memory Efficient In-Pixel Histogramming" and (2) U.S. patent application Ser. No. 18/066,647, filed Dec. 15, 2022, and entitled "Systems and Methods for Memory-Efficient Pixel Histogramming", the entire disclosure of which is incorporated herein by reference, we may use a fewer number of memory bins (e.g., 50 bins) and wraparound the histogram using more than one bin width and with an offset. However, once again, it should be understood that these values are examples only, and more or fewer memory bins can be used with longer or shorter temporal range as well as longer or shorter pulse widths and/or longer of shorter bin widths if desired by a practitioner.

The collection time for a given frame can be divided into a first collection subframe and a second collection subframe. Laser pulse cycles for the frame can then be allocated to these two collection subframes. The first collection subframe can be labeled in an example as a "diffuse acquisition" phase, and a practitioner may choose to allocate the majority of the laser pulse cycles for the frame to the first collection subframe. A purpose of the first collection subframe is to generate histogram data from which a peak bin can be determined to establish a coarse (or "rough") estimate of range to the target. The second collection subframe can be labeled in an example as a "retroreflector resolution" phase, and a practitioner may choose to allocate a minority of the laser pulse cycles for the frame to the second collection subframe. A purpose of the second collection subframe is to generate histogram data from which a peak bin can be determined to establish a fine range adjustment to the coarse range estimate. In an example embodiment, the first collection subframe will precede the second collection subframe, although this need not necessarily be the case. Similarly, in an example embodiment, the first collection subframe and the second collection subframe can each cover contiguous blocks of time. However, this need not necessarily be the case (for example, a practitioner may choose to interleave different portions of the first collection subframe with different portions of the second collection subframe).

Figure 1B:
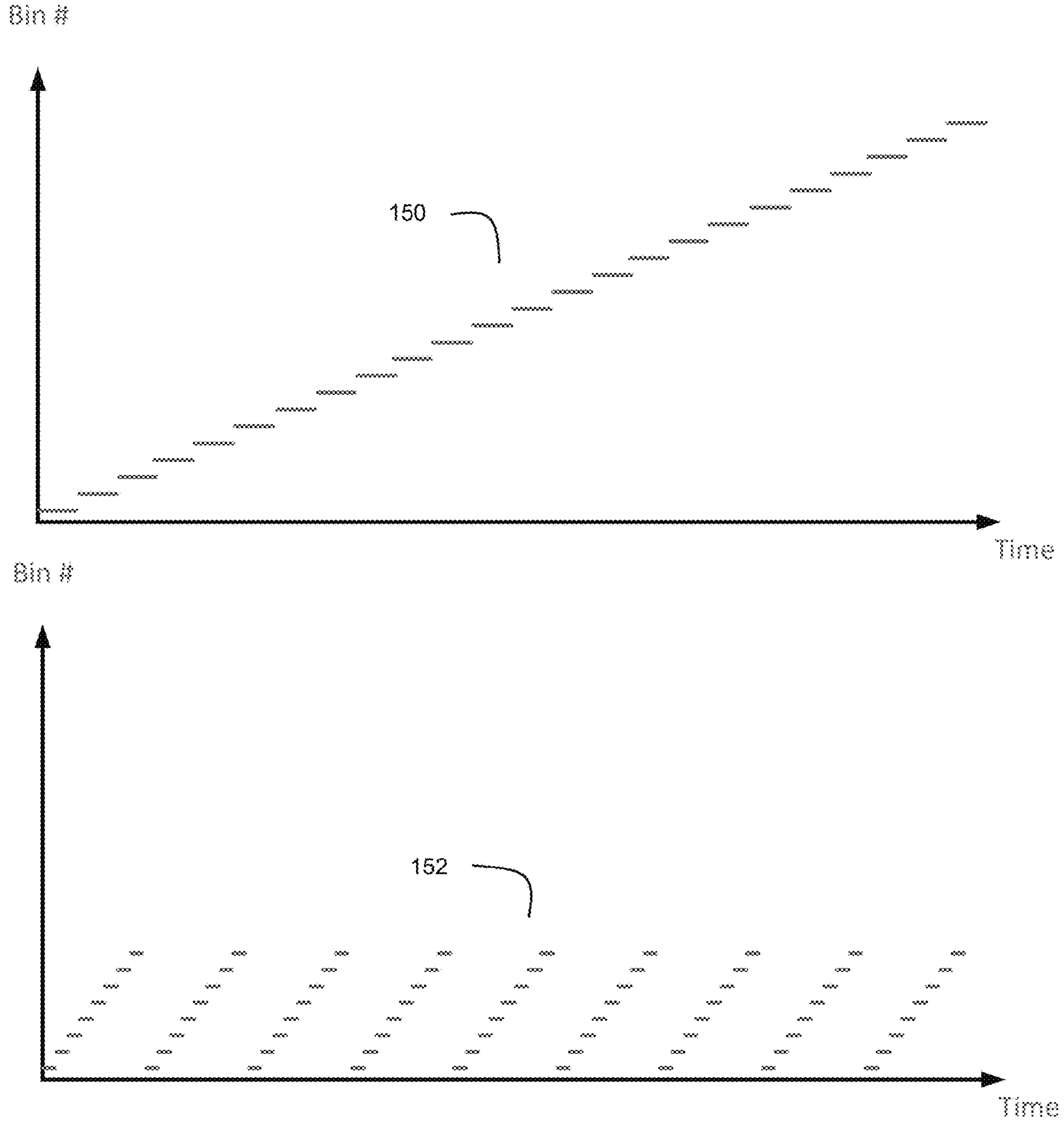
FIG. 1B shows examples of bin maps that can be used to map time to bins for the first and second collection subframes of the FIG. 1A process flow.

At step 102 of FIG. 1A, the system operates during the first collection subframe to accumulate time-referenced returns in histogram bins over a plurality of laser pulse cycles using a first mapping of bins to time. In an example embodiment, this signal acquisition can be conducted using conventional bin histogramming, for example, for a number of laser cycles (e.g., a total of 1,000 laser cycles). Plot 150 if FIG. 1B shows an example bin map that can be used to map time to histogram bins for the histogramming operation of step 102. In FIG. 1B, we see that the bin map 150 maps each time point (corresponding to a range of arrival times) to a single diffuse acquisition histogram bin. A practitioner may choose to establish a bin width for each diffuse acquisition histogram bin that corresponds to a relatively long time duration. As an example, the bin width for the bins in bin map 150 could be 2 ns (where this 2 ns bin width can be uniform for all bins of the bin map 150). However, it should be understood that this is an example only, and a practitioner may choose to employ smaller or larger bin widths for the bin map 150 if desired. Similarly, a practitioner may choose to employ bins that cover a longer maximum detection range than that shown by plot 150 of FIG. 1B if desired. Once the diffuse acquisition at step 102 is complete, histogram values can be either read out or transferred to a secondary memory array (e.g., ping pong memory) for later readout (e.g., sequential) while the pixel array is ready to continue with its acquisition. According to this example embodiment, after readout or transfer of the data, the memory array that holds the histogram data from step 102 is reset.

At step 104, a second part of the frame is initiated for the second collection subframe (the "retroreflector resolution" phase). At step 104, the laser emitter can continue to pulse at the same repetition rate as it had during step 102; although this need not necessarily be the case. During the second collection subframe at step 104, the system accumulates time-referenced returns in histogram bins over another plurality of laser pulse cycles using a second mapping of bins to time. As an example, the number of laser pulse cycles used for the second collection subframe can be 50 additional laser cycles. However, more or fewer laser pulse cycles can be used for the second collection subframe if desired by a practitioner. Also, the second mapping of bins to time used for the second collection subframe can time the bins faster than they were timed during the first collection subframe, in which case each bin duration for the second collection subframe is shorter than during the first collection subframe. Furthermore, the second collection subframe can use fewer bins than are used by the first collection subframe. Plot 152 of FIG. 1B shows an example bin map that can be used for the second collection subframe (in comparison to the bin map 150 of FIG. 1B for the first collection subframe). We can see from FIG. 1B that the duration of each histogram bin for bin map 152 is relatively short as compared to bin map 150, but each bin of bin map 152 is mapped to multiple arrival time windows. However, this can be tolerated because the second collection subframe is being used to derive an adjustment of a raw time of arrival from the first collection subframe. As explained herein, the use of bin maps 150 and 152 can provide high temporal resolution even in the presence of pile-up.

In the example of FIG. 1B, each histogram bin in bin map 152 may now correspond to 250 psec (or 3.75 cm in range) (where this 250 psec bin width can be uniform for all bins of the bin map 152). In this example, 8 short bins (for the histogram collected during the second collection subframe) correspond to a single long bin (for the histogram collected during the first collection subframe), and only 8 memory bins are used to hold the histogram data for the second collection subframe. These bins are addressed in a round robin configuration (bins 1-8, then bins 1-8, etc.). At the end of the second collection subframe, the 8 bins are read out.

At step 106, a circuit (which may include a processor) resolves the range to the target for the pixel in a manner that handles a pixel pile-up condition. To do so, the range to target is determined based on (1) data indicative of a coarse (rough) range estimate that is derived from the histogram data generated at step 102 for the first collection subframe and (2) data indicative of a range adjustment that is derived from the histogram data generated at step 104 for the second collection subframe.

To determine whether a pile-up condition is present, the circuit can (1) compare the total number of counts in the pixel to a predefined threshold or (2) compare the total number of counts in one or more bins of the pixel to a predefined threshold. As an example, the circuit can compare the number of counts in the diffuse acquisition bin with the highest number of counts to a threshold. In one example embodiment, each pixel generates and outputs a flag (e.g., a "saturation" flag), which is set if the pixel reaches a threshold count value (e.g., if the sum of counts in all bins for the pixel reaches the threshold). In another example embodiment, each pixel sets the saturation flag to high if one or a collection of bins for the pixel (e.g., any 2 or 3 adjacent bins) reach a threshold count value. If the saturation flag's value is "1", then we have a piled-up pixel. For those piled up pixels, the highest-count bin from the diffuse acquisition histogram is identified. It should be understood that a practitioner can define the threshold value used to set the saturation flag on the basis of a number of factors to detect pixel pile-up conditions with a reasonable degree of accuracy, where such factors include the number of laser pulse cycles for the diffuse acquisition phase, the bin width used for the diffuse acquisition phase, the bit depth of the bins, etc.

Figure 1C:
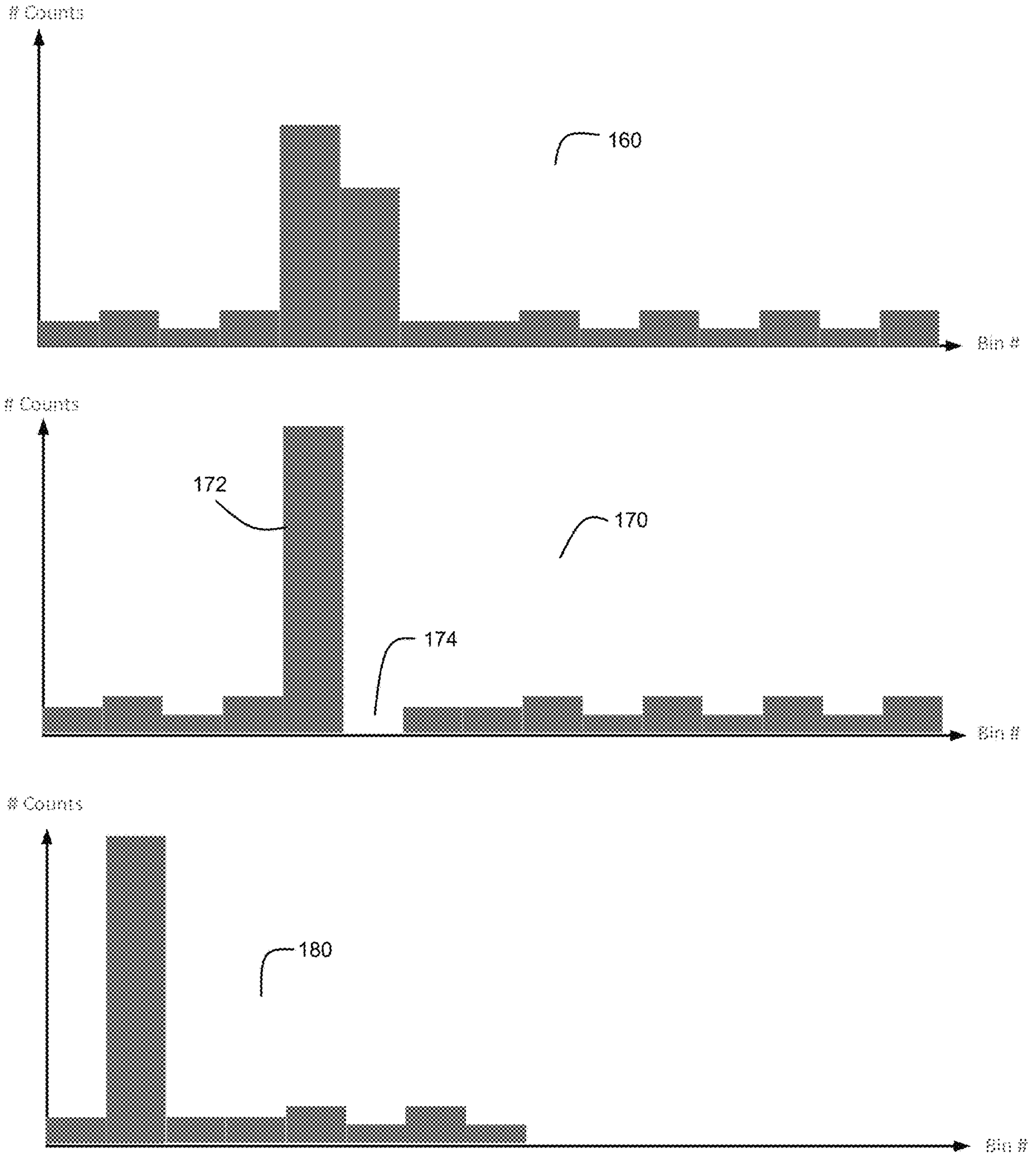
FIG. 1C shows examples of histograms that can be generated during the first and second collection subframes of the FIG. 1A process flow.

FIG. 1C shows an example histogram 160 that can be generated during the first collection subframe using bin map 150 of FIG. 1B. It can be seen from histogram 160 that there is no pile-up. By contrast, FIG. 1C shows a diffuse acquisition histogram 170 that was generated using bin map 150 with pile-up (see the fifth bin 172). As can be seen, instead of a pseudo-Gaussian count distribution around the peak which is seen in histogram 160 (and which allows for peak position interpolation), the piled-up histogram contains all counts in one bin 172 (while leaving the next bin 174 empty), and it is impossible to interpolate the actual peak position to a finer time than the bin width without the benefit of the histogram data from the second collection subframe.

For those pixels which are piled-up, the position or positions of the highest-count bin (alternately more than 1 bin if they are above the noise floor) can be calculated from the retroreflector resolution phase readout. The circuit can calculate the raw (coarse) time of arrival from histogram data for the first collection subframe (by calculating the time corresponding to the leading edge of the saturated or highest bin). In the case of pile-up, the fine time-of-arrival can be calculated by identifying the highest bin of the retroreflector resolution bins and translating this identified bin to a fine time of arrival adjustment with respect to the raw (coarse) time of arrival derived from the diffuse acquisition phase. For example, this translation can be performed by multiplying the time per fine bin by the bin number of the identified highest count bin from the retroreflector resolution phase to yield the fine time of arrival adjustment. This fine time of arrival adjustment can then be added to the raw time of arrival from the diffuse acquisition phase to compute the fine time of arrival. As should be understood, these times are readily convertible into ranges by factoring in the roundtrip time for the light and the speed of light.

FIG. 1C shows an example histogram 180 that can be generated during the second collection subframe using bin map 152 of FIG. 1B. Since the duration of each of the 8 bins in the retroreflector resolution phase is much shorter than duration of the bins in the diffuse acquisition phase, we can resolve the position of the return (echo) from the object that the pixel is looking at with much finer resolution than with the gross diffuse acquisition bins by localizing the retroreflector signal within a specific bin of histogram 180 (and using this localization to fine-tune/adjust the rough approximation from the diffuse acquisition phase).

For example, assume a retroreflector is present 11.53 m from the target and that each diffuse acquisition bin is 2 ns wide. For simplicity, assume we use 100 bins to collect the diffuse histogram and 8 bins to collect the retroreflector-resolution histogram. Each retroreflector resolution bin is 250 ps wide. Further, assume that bin 1 of the diffuse acquisition phase and bin 1 of the retroreflector resolution phase are calibrated so they are delayed by the same time from the laser pulse, and that this time delay is 0. In this case, the target presence at a range of 11.53 m (which corresponds to 76.9 ns round-trip time) results in Bin 39 of the diffuse acquisition histogram becoming saturated due to the specular reflection, causing the saturation flag to be set. During the retroreflector resolution phase, the retroreflector return (echo) will arrive 0.9 ns after the start of the round-robin bin counts, and the counts will maximize at Bin 4 of the retroreflector resolution histogram. In this case, the circuit will cycle through the retroreflector resolution bins 38 times during the first 76 ns of the round-trip time, and the remaining 0.9 ns of the round-trip time will thus align with Bin 4 on the $39^{th}$ pass through the retroreflector resolution bins. The processor can then (1) identify the saturation flag as being set for this pixel, (2) record the diffuse acquisition bin which is highest count (namely Bin 39 of the diffuse acquisition histogram data), (3) identify the retroreflector resolution bin which is highest count (namely, Bin 4 of the retroreflector resolution histogram data), and (4) deduce that the target is located between 76.75 ns and 77 ns, i.e. 11.512 m and 11.55 m, based on the translations of the highest count bins to time as discussed above.

As noted, the retroreflector bins exhibit timing that is faster than the diffuse acquisition bins. For example, the diffuse acquisition bins can exhibit bin widths that are 2×, 4×, 8×, 16×, 32×, 64×, 128×, etc. larger than the retroreflector resolution bins. However, it should be understood that the duration of each diffuse acquisition bin need not be an integer multiple of the duration of each retroreflector resolution bin.

Figure 2A:
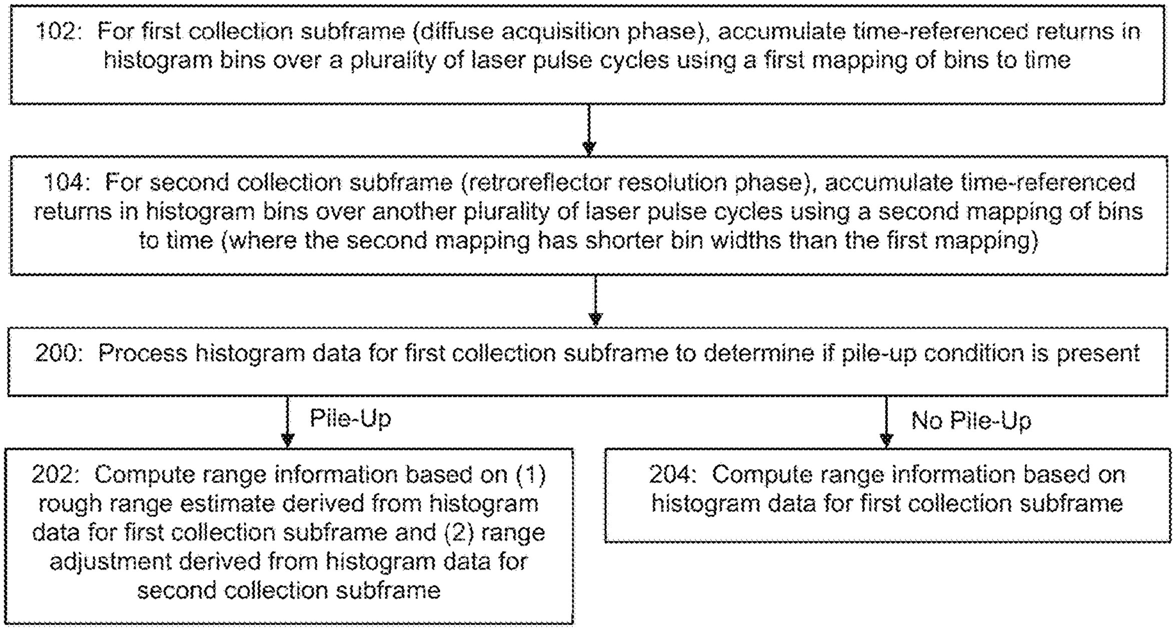
FIG. 2A shows an example embodiment where the histogram data for the first and second collection subframes is to be generated regardless of whether pixel pile-up occurs.

FIG. 2A shows an example embodiment of the FIG. 1A process flow where steps 102 and 104 are performed for all frames, regardless of whether pixel pile-up is detected. Step 200 operates to process the histogram data for the first collection subframe to determine if a pile-up condition is present. This determination can be made using the threshold-based techniques discussed above. Furthermore, step 200 can be performed by logic within circuitry of the pixel or by logic external to the pixel (e.g., signal processing circuitry of an optical receiver of which the pixel is a component). If step 200 results in a determination that a pile-up condition is present, then the process flow can proceed to step 202 where the range to target is computed based on (1) data indicative of a coarse range estimate derived from the histogram data for the first collection subframe as discussed above and (2) data indicative of a range adjustment derived from the histogram data for the second collection subframe as discussed above. If step 200 results in a determination that a pile-up condition is not present, then the process flow can proceed to step 204 where the range to target is computed based on the histogram data for the first collection subframe. In order to compute range with better resolution than the bin width of the diffuse acquisition histogram bins, step 204 can employ interpolation techniques based on the counts of bins that are adjacent to the peak signal bin of the diffuse acquisition histogram. For example, with reference to histogram 160 of FIG. 1C, Bin 5 can serve as the peak signal bin. Given that Bin 6 shows a larger count than Bin 4, the system can interpolate that the position of the pulse peak within the time range covered by Bin 5 falls closer to Bin 6 than to Bin 4. In example embodiment, TCSPC techniques can be used as part of the range determination at step 204.

Figure 2B:
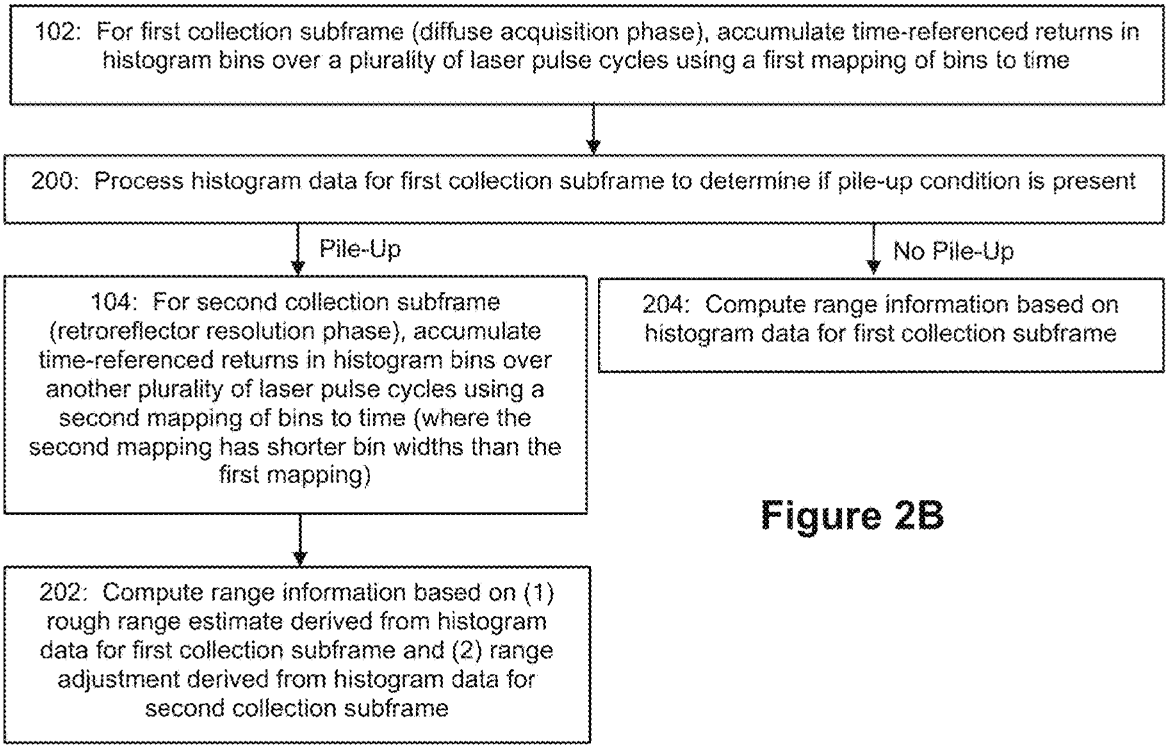
FIG. 2B shows an example embodiment where the histogram data for the second collection subframe is to be generated if the histogram data for the first collection subframe indicates that pixel pile-up is present.

FIG. 2B shows an example embodiment of the FIG. 1A process flow where step 104 is conditionally performed only if the diffuse acquisition phase results in a pile-up condition. As such, FIG. 2B shows step 200 being performed after step 102, with step 104 being performed if step 200 results in a determination that a pile-up condition is present. Steps 202 and 204 can otherwise be performed as discussed above for FIG. 2A.

In an example embodiment, the diffuse acquisition bins and the retroreflector resolution bins are each allocated their own physical memory locations (e.g., addresses of a memory within the pixel). Under this embodiment, either 2 readouts are performed per frame at the conclusion of the diffuse acquisition phase and at the conclusion of the retroreflector resolution phase (which can be characterized as readout on a per phase or per subframe basis), or only a single readout is performed per frame (which can be characterized as readout on a per frame basis), whereby the diffuse acquisition bins and the retroreflector resolution bins are read-out together. Downstream processing is as described above.

However, in another example embodiment, memory locations can be shared by the diffuse acquisition bins and the retroreflector resolution bins. In an example for this approach, readout can be performed on a per phase/subframe basis, with the shared memory locations being reset after each readout.

In another example embodiment, the system can perform only a single readout of histogram data per frame, in which case he diffuse acquisition and retroreflector resolution parts are added, thus reducing the required number of readouts. This can be performed for one or more (which may include all) of the pixels of the receiver. As before, pixels which are piled-up are first identified. In this case, we can use a double-round-robin. In the example above, we can populate the first 32 bins for the fine resolution, each with 250 ps bin width. This ensures that at least one of the 2 groups of 8 bins will not overlap the diffuse acquisition histogram (e.g., if it populates bins 1-3). Upon reading out the histogram values and identifying the piled up bin, the processor can first subtract the background level from all bins, then select the non-saturated retroreflector-resolution bins, and thereby calculate the fine time of the return (echo) within the saturated bin.

In an example embodiment, the timing signals for steps 102 and 104 are generated by a global clock (e.g., see N. Egidos, et al., "20-ps resolution Clock Distribution Network for a fast-timing single photon detector", IEEE Transactions on Nuclear Science, April 2021, the entire disclosure of which is incorporated herein by reference). In an example embodiment, the short bins of the retroreflector resolution phase can be generated by taps from a slower global clock in the pixel or in distributed regions of the array.

In an example embodiment, variable delay lines can be used to calibrate the bin timings of the first and second collection subframes. In an example embodiment, the duration of the bins can be assured by design, e.g., by proper design of the taps, and the skew of the 2 groups of bins is determined either by design or by calibration. In an example embodiment, an on-chip temperature sensor(s) can be used to monitor the sensor's temperature, and a calibration is conducted to determine the skew between the bins per pixel and as a function of temperature.

A practitioner can use any of a number of factors to decide on suitable bin depths for the histogram bins. For example, in one embodiment, the bit depth (corresponding to the maximal number of counts per bin) for the retroreflector-resolution bins can be different than that of the bit depths for the diffuse acquisition bins. This difference can be attributable to the ratio between the expected number of counts in the retroreflector resolution phase and the expected number of counts in the diffusion acquisition phase. For example, consider a scenario where the diffuse acquisition phase and the retroreflector resolution phase employ the same number of laser pulse cycles. If 100 bins are used for the diffuse acquisition phase and 8 bins are used for the retroreflector resolution phase, the use of the same number of laser pulse cycles for each phase will mean that it would be desirable for each of the 8 bins of the retroreflector resolution phase to each accommodate 100/8 (12.5) more counts than each of the 100 bins of the diffuse acquisition phase, which would translates to 4 additional bits per bin (2^4=16) for the retroreflector resolution bins relative to the diffuse acquisition bins. For scenarios where the retroreflector resolution phase employs fewer laser pulse cycles than the diffuse acquisition phase (as is preferred), the lower number of shots during the retroreflector reflection phase can be taken into consideration when defining the suitable bit depths.

Figure 3A:
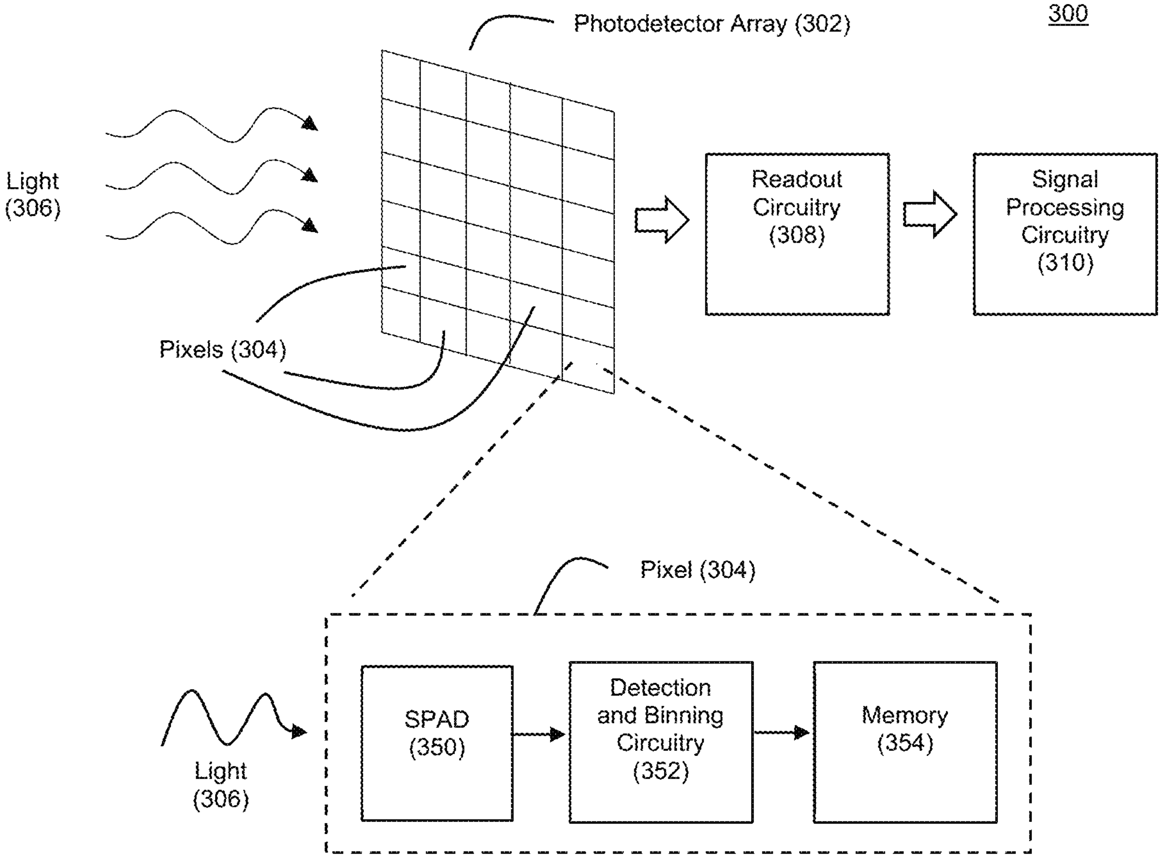
FIG. 3A shows an example optical receiver architecture for use in an example embodiment.

FIG. 3A shows an example system architecture for a sensor such as optical receiver 300 (such as a dTOF sensor system that can be used in optical systems such as lidar systems). Each pixel 304 of a photodetector array 302 can include a photodetector such as a SPAD 350, circuitry 352 that provides detection and histogram binning operations, and a memory 354 that holds the bins and histogram data. As light 306 is incident on the pixel 304, the circuitry 352 detects avalanche signals from the SPAD 350 and performs histogramming in the memory 354 using the techniques described herein. Further still, the detection and binning circuitry 352 may perform additional operations that support SPAD-based light detection and histogramming, such as time digitization operations, quenching the avalanche signals generated by the SPAD 350 in response to photon arrival, recharging the SPAD, monitoring for memory saturation, providing and filtering supply currents and voltages, etc. Readout circuitry 308 can then read the histogram data from the memory 354 as discussed herein, and signal processing circuitry 310 can process the histogram data to resolve range using techniques described herein.

While this example uses a SPAD 350 as the photodetector element, it should be understood that other types of photodetectors can be employed if desired by a practitioner. For example, any type of photodetector that can measure photon times of arrival and which may experience pile-up (e.g., photodetectors that are inactive for a period of time following photon arrival ("dead time")) can be employed. As an example, a silicon photomultiplier (SiPM) can be used as the photodetector if desired by a practitioner.

SPAD 350, circuitry 352, and memory 354 are all preferably resident inside the pixel 304. For example, circuitry 352 and/or memory 354 can be on the same substrate or die as the SPAD array. In another example, the circuitry 352 and/or memory 354 can be inside a bonded pixel on a different die or substrate (e.g., where the SPAD 350 is on a SPAD wafer while the circuitry 352 and the memory 354 are on a CMOS readout integrated circuit (ROIC) wafer which is bonded to the SPAD wafer, or while the memory 354 is on a memory wafer which is bonded to the CMOS ROIC wafer) where the die(s)/substrate(s) for the circuitry 352 and/or memory 354 is/are interconnected (e.g., vertically interconnected) with the SPAD array die/substrate. Moreover, each pixel 304 can include its own instance of the one or more SPADs 350, circuitry 352, and memory 354, or such circuitry may be shared by more than one pixel. Further still, in other example embodiments, the circuitry 352 and/or memory 354 are on-chip but outside the pixel array. In still other example embodiments, the circuitry 352 and/or memory 354 can be outside the chip such as where the memory 354 is on an external board.

The optical receiver 300 also comprises readout circuitry 308 that is responsible for reading histogram data out of the pixel memories 354 and signal processing circuitry 310 that is responsible for processing the histogram data to determine information such as range to objects in the field of view for the photodetector array 302. The readout circuitry 308 and/or signal processing circuitry 310 can be internal to or external to the pixel 304 and/or the photodetector array 302.

As noted above, depending on the needs and desires of a practitioner, the readout circuitry 308 may read out the histogram data from the memory 354 on a per-frame basis or a per-phase basis.

The signal processing circuitry 310 may include one or more compute resources for carrying out histogram data processing operations as described herein (e.g., one or more microprocessors, field programmable gate arrays (FPGAs) and/or application-specific integrated circuits (ASICs)).

Figure 3B:
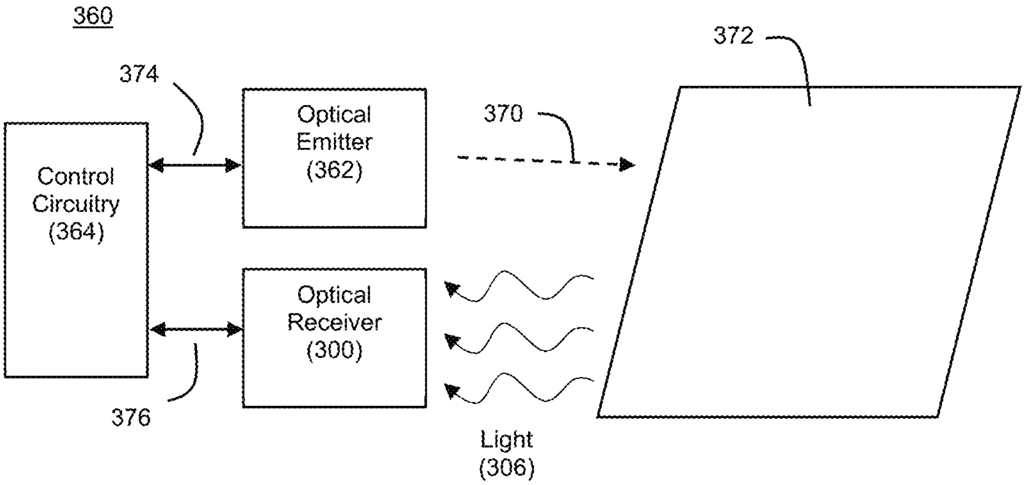
FIG. 3B shows an example optical system architecture for use in an example embodiment.

The optical receiver 300 can be employed in an optical system 360 such as that shown by FIG. 3B. Optical system 360 shown by FIG. 3B also includes an optical emitter 362 that emits light pulses 370 into an environment 372 for the optical receiver 300 (where the environment 372 encompasses the field of view for each pixel 304). The incident light 306 will include returns (echoes) from these light pulses 370, and the histogram data generated by the optical receiver 300 using the techniques described herein will allow the optical receiver 300 to include range information in frames derived from the incident light 306. Control circuitry 364 can coordinate the operation of the optical emitter 362 and optical receiver 300 such as by controlling the timing and targeting of light pulses 370 by the optical emitter 362 via data path 374 and controlling operational parameters for the optical receiver 300 as well as processing frames via data path 376.

The optical emitter 362 can include a pulsed laser emitter such as one or more VCSELs for emitting laser pulses, and it may also include beam shaping optics such as a diffuser. The optical receiver 300 may also include receive optics such as a collection lens, a spectral filter that passes reflected laser pulses within incident light 306 but rejects much of the incident light 306 that is uncorrelated to the laser pulse emissions. The photodetector array 302 may be single tier, dual tier, or more than dual tier. For example, one tier may comprise the array of SPADs 350 and other tiers may include timing, sampling, amplification, power supply, memory, and processing circuitry.

As an example, the optical system 360 can be a lidar system such as a flash lidar system or a scanning lidar system. Such lidar systems can be used for a variety of applications, including automotive applications, industrial automation, security monitoring, aerial and environmental monitoring, etc. The optical system 360 may also take the form of a 3D camera, such as a 3D camera incorporated into a mobile device such as a smart phone. For example, the emitter 362 may illuminate the whole scene or may use structured light to illuminate spots in the scene (where multiple combinations of spots may be illuminated at a given time). The photodetector array 302 may identify which pixels 304 are sensing these illuminated spots at any given time; and the receiver 300 can process only the outputs from those pixels 304 (e.g., as event-driven pixel processing). As additional examples, the optical system 360 can be a FLIM, a TD-NIRS imager, an acousto-optical imager, and/or a TOF-PET imager.

In an example where the optical system 360 is a scanning system, the optical emitter 362 can be an array of emitters (e.g., a 2D array of VCSELs or the like). Control circuitry 364 can select and activate the emitters in groups (e.g., activating one or more columns of the emitters, one or more rows of the emitters, etc.) over time to fire multiple light pulses at a time. The optical receiver 300 can, in an example embodiment, activate only the group of pixels 304 in the photodetector array 302 whose fields of view are illuminated by the selected emitters that are firing light pulses. In this configuration, the memory array for creating the histogram data can be shared by the activated group of pixels 304 (e.g., if a whole column of pixels 304 is active at one time, then the memory array of histogram data can be shared by the whole column of pixels 304; if a whole row of pixels is active at one time, then the memory of histogram data can be shared by the whole row of pixels 304; etc.). Each SPAD 350 in the active pixels 304 can image the whole azimuth at a given elevation (or vice versa if applicable), and a new histogram can be generated each time a new group of emitters in the array of emitters starts firing. In another example embodiment, more than one SPAD 350 can be connected to a memory array so that more than one photon may be detected within the dead time interval for the SPAD 350 (which yield higher dynamic range). This configuration can be characterized as a silicon photomultiplier (SiPM) arrangement.

Practitioners can choose to design the optical system 360 so that it exhibits any of a number of different operational parameters based on what the practitioners want to accomplish. For example, the number of pixels in the photodetector array 302 can include 100, 200, 1,000, 5,000, 10,000, 25,000, 100,000, 1 million, 20 million pixels, etc. Similarly, the detection range supported by the optical receiver 300 may range from 50 cm or less to tens of kilometers (e.g., 50 km, 60 km, 70 km, etc.). The number of bins in the memory 354 may range from 10 to 5,000 bins. Also, the bin widths used for the histogramming process may range from 50 fsec to 50 μsec. The number of light pulse cycles included in the first and second collection subframes may range from 10 to 50,000 light pulse cycles, and each collection subframe need not encompass the same number of light pulse cycles. For example, as noted, a practitioner may choose to include a much larger number of laser pulse cycles in the diffuse acquisition phase than in the retroreflector resolution phase. Also, the pulse width for the light pulses may range from 10 fsec to 500 μsec.

Figure 4:
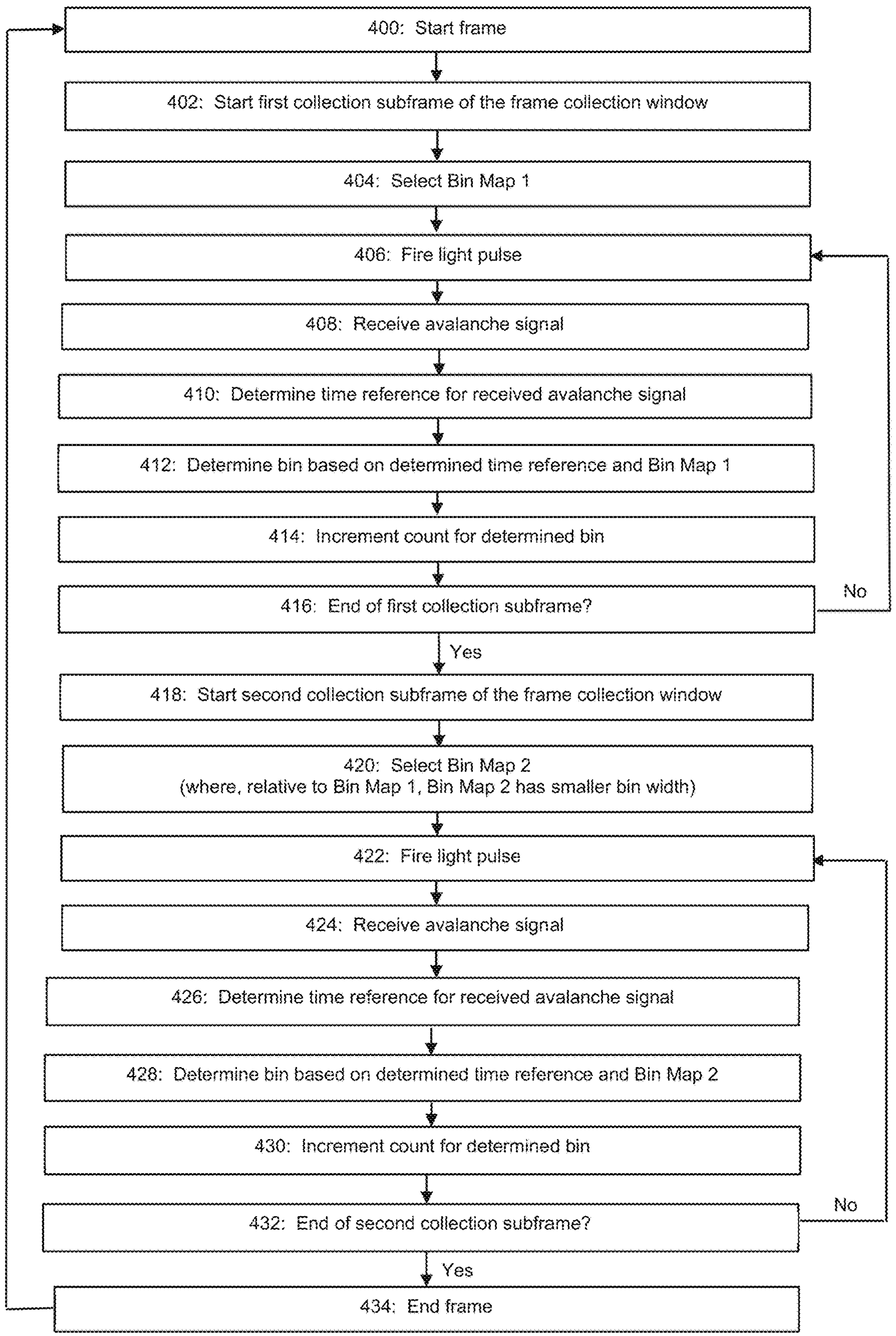
FIG. 4 shows an example process flow to be performed by the detection and binning circuitry of FIG. 3A to generate histogram data for the first and second collection subframes.

FIG. 4 depicts an example process flow for circuitry 352 and memory 354 to perform steps 102 and 104. At step 400, the frame starts. As an example, this frame can be a lidar frame. At step 402, the first collection subframe starts, and at step 404, the bin map to be used for the first collection subframe is selected (e.g., bin map 150 from FIG. 1B can serve as Bin Map 1).

At step 406, the optical emitter 360 fires a light pulse into the field of view for the optical receiver (e.g., a laser pulse shot), and circuitry 352 begins checking whether the SPAD 350 has produced an avalanche signal (step 408). If no avalanche signal is detected over the course of the detection range for the pixel (e.g., the acquisition gate as shown by the time extent of the combined diffuse acquisition bins of FIG. 1B), then the process flow can proceed to step 416 without performing steps 408, 410, 412, and 414. But, in the event that step 406 results in a detection of the avalanche signal within the detection range/acquisition gate, the circuitry 352 at step 410 determines a time reference for this detection (where this time reference can be anchored to the light pulse transmission at step 406 and thus represent a time of arrival for the photon that produced the avalanche signal relative to the light pulse emission). As noted, clock signals can be used to track time as the circuit cycles through bins while time progresses (e.g., see the above-described and incorporated '387 and '647 patent applications for a discussion of how time references for bin histogramming can be tracked). At step 412, the circuitry 352 determines the bin that is associated with the determined time reference by the bin map selected at step 404 (Bin Map 1). At step 414, the circuitry 352 increments the count value stored by the determined bin.

At step 416, the circuitry 352 determines whether the end of the first collection subframe has been reached. If the first collection subframe has not ended, then the process flow returns to step 406 for the firing of the next light pulse (at which point the time reference is reset). The first collection subframe will encompass a plurality of light pulse cycles (e.g., 100, 500, 1,000, 2,500, 5,000, 10,000, etc. light pulse cycles), so the process flow will loop back to step 406 many times during the first collection subframe. The determination of whether the first collection subframe has ended can be based on a time threshold for the first collection subframe or a shot threshold as compared to a counter value that represents the number of light pulse cycles that have thus far occurred during the first collection subframe.

If step 416 results in a conclusion that the first collection subframe has ended, then the process flow proceeds to step 418 (where the second collection subframe begins). For the second collection subframe, at step 420, the bin map to be used for the second collection subframe is selected (e.g., bin map 152 from FIG. 1B can serve as Bin Map 2). As noted above, Bin Map 2 will have a shorter bin width than Bin Map 2 and will thus wrap around at least once over the detection range of the optical receiver 300. At this point, steps 422, 424, 426, 428, and 430 operate in a similar fashion as described above for steps 406, 408, 410, 412, and 414, albeit where Bin Map 2 is used to map the timed avalanche signal to an appropriate bin in memory 354 (rather than Bin Map 1).

At step 432, the circuitry 352 determines whether the end of the second collection subframe has been reached. If the second collection subframe has not ended, then the process flow returns to step 422 for the firing of the next light pulse (at which point the time reference is reset). The second collection subframe will also encompass a plurality of light pulse cycles, preferably a smaller number of laser pulse cycles than were encompassed by the first collection subframe (e.g., a 2× reduction, a 5× reduction, a 10× reduction, a 20× reduction, a 50× reduction, 100× reduction, etc.). However, this need not necessarily be the case if desired by a practitioner. Accordingly, the process flow will loop back to step 422 many times during the second collection subframe. The determination of whether the second collection subframe has ended can be based on a time threshold for the second collection subframe or a shot threshold as compared to a counter value that represents the number of light pulse cycles that have thus far occurred during the second collection subframe. If step 432 results in a determination that the second collection subframe has ended, this means that the frame has been collected and the process flow for that frame can end (step 434). At this point, the histogram data is ready for readout from memory 354, and the process flow can start fresh at step 400 for the next frame.

In this fashion, the operation of the FIG. 4 process flow will produce histogram data in memory 354 where the bin positions of the peaks of the histogram data will be resolvable to identify the range to an object in the field of view for the subject pixel even if pile-up conditions are present on the pixel.

Figure 5:
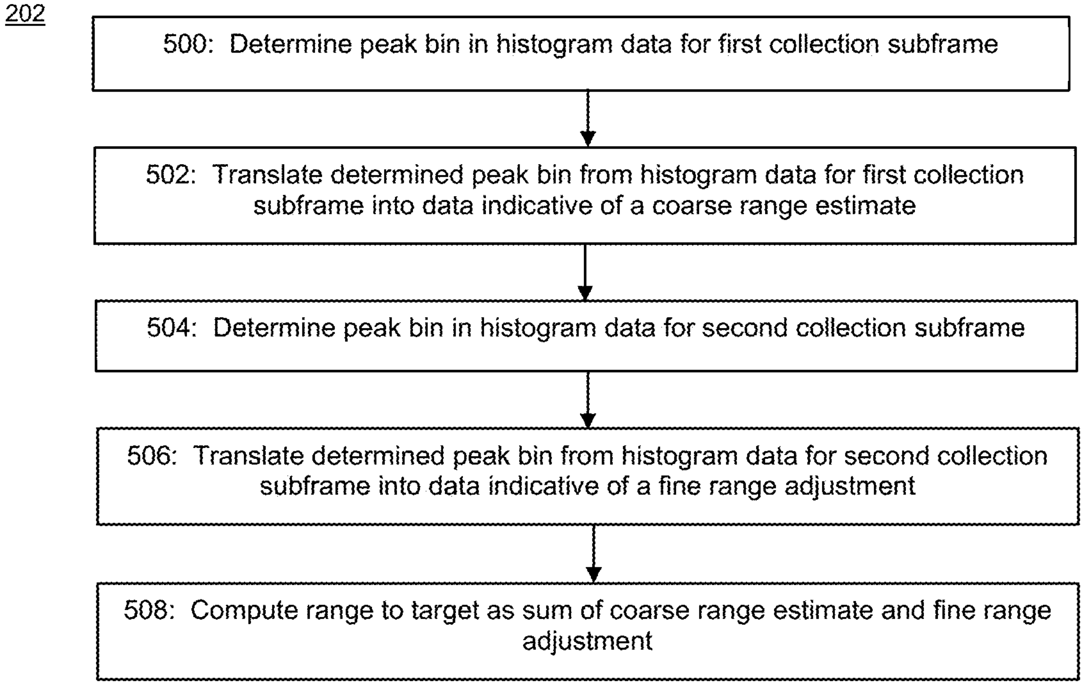
FIG. 5 shows an example process flow to be performed by the signal processing circuitry of FIG. 3A to compute range based on the histogram data for the first and second collection subframes in the event of pixel pile-up.

FIG. 5 depicts an example process flow for signal processing circuitry 310 to perform step 202. At step 500, the circuit 310 determines the peak signal bin in the histogram data for the first collection subframe. At step 502, this peak bin is translated into data indicative of a coarse range estimate based on the time of arrival window corresponding to that peak bin. This data may comprise a time of arrival value or a range value. For example, if the diffuse acquisition histogram has 100 bins, with each bin exhibiting a 2 ns bin width, and where Bin 50 is the peak signal bin, this means that the time of arrival window covered by Bin 50 would be between 98-100 ns. The lower end of this window can serve as a coarse range estimate (where a time of arrival of 98 ns is readily convertible to a coarse range estimate of 14.7 m based on the speed of light and the roundtrip time for the returns). At step 504, the circuit 310 determines the peak signal bin in the histogram data for the second collection subframe. At step 506, this peak bin is translated into data indicative of a fine range adjustment based on the time of arrival window corresponding to that peak bin. This data may comprise a time of arrival adjustment value or a range adjustment value. For example, if the retroreflector resolution histogram has 8 bins, with each bin exhibiting a 250 psec bin width, and where Bin 5 is the peak signal bin, this means that the time of arrival window covered by Bin 5 would be 1 ns to 1.25 ns (where a time of arrival of 1 ns is readibly translatable to a fine range adjustment of 0.15 meters and where a time of arrival of 1.25 ns is readily translatable to a fine range adjustment of 0.1875 meters). At step 508, the circuit 310 computes the range to target as the sum of the coarse range estimate and the fine range adjustment. For example, continuing with the example above, the computed range can be based on a time of arrival window between 99 ns (98 ns+1 ns adjustment) and 99.25 ns (98 ns+1.25 ns adjustment), which translates to a range between 14.85 meters and 14.8875 meters.

While the invention has been described above in relation to its example embodiments, various modifications may be made thereto that still fall within the invention's scope. These and other modifications to the invention will be recognizable upon review of the teachings herein.

What is claimed is:

1. A system comprising:

a photodetector having a field of view, wherein the photodetector generates signals indicative of photon detections in response to incident light over time;

a memory; and a circuit that generates first histogram data and second histogram data in the memory based on the generated signals during a first collection subframe and a second collection subframe of a frame respectively using a first mapping and a second mapping of time to bins respectively, wherein the second mapping of time to bins for the second collection subframe exhibits shorter bin widths than the first mapping of time to bins for the first collection subframe, wherein a range to a target in the field of view is resolvable in the event of a pile-up condition for the photodetector based on (1) data indicative of a coarse range estimate derived from the first histogram data and (2) data indicative of a range adjustment derived from the second histogram data.

2. The system of claim 1 wherein the first collection subframe encompasses a first plurality of light pulse cycles, and wherein the second collection subframe encompasses a second plurality of light pulse cycles, and wherein the circuit time-references the generated signals relative to light pulse emissions.

3. The system of claim 2 wherein the first plurality of light pulse cycles has more light pulse cycles than the second plurality of light pulse cycles.

4. The system of claim 1 wherein the circuit processes the first histogram data to determine whether the pile-up condition exists based on defined criteria.

5. The system of claim 4 wherein the circuit, in response to a determination that the pile-up condition exists, (1) computes data indicative of the coarse range estimate based on the first histogram data, (2) computes data indicative of the range adjustment based on the second histogram data, and (3) determines the range to the target based on (i) the data indicative of the coarse range estimate and (ii) the data indicative of the range adjustment.

6. The system of claim 5 wherein the circuit, in response to a determination that the pile-up condition does not exist, determines the range to the target based on interpolation applied to the first histogram data.

7. The system of claim 5 wherein the circuit comprises a plurality of circuits.

8. The system of claim 7 wherein the plurality of circuits include a detection and binning circuit and a signal processing circuit.

9. The system of claim 8 wherein the photodetector, the memory, and the detection and binning circuit are part of a pixel.

10. The system of claim 9 wherein the pixel is part of an optical receiver, the optical receiver comprising a photodetector array, the photodetector array comprising a plurality of instances of the pixel, each pixel with a different field of view.

11. The system of claim 1 wherein the photodetector, the memory, and the circuit are part of a lidar system.

12. The system of claim 1 wherein the bins defined by the first mapping and the second mapping occupy different addresses in the memory.

13. The system of claim 1 wherein at least one of the bins defined by the first mapping occupies a memory address shared by at least one of the bins defined by the second mapping.

14. The system of claim 1 wherein the circuit reads out the first histogram data and the second histogram data from the memory on a per frame basis.

15. The system of claim 1 wherein the circuit reads out the first histogram data and the second histogram data from the memory on a per subframe basis.

16. The system of claim 1 wherein the first mapping defines a number of bins that is greater than a number of bins defined by the second mapping.

17. The system of claim 1 wherein the first mapping and the second mapping each cover a detection range of the system, and wherein the second mapping defines bins that wrap around to map to multiple different time windows of the detection range.

18. The system of claim 1 wherein the circuit generates the first histogram data and the second histogram data regardless of whether the pile-up condition is present.

19. A method of resolving range to a target in a field of view of a pixel in the event of a pile-up condition for the pixel, the method comprising:

dividing a frame collection time for the pixel into a first collection subframe and a second collection subframe, wherein the first collection subframe encompasses a first plurality of light pulse cycles, and wherein the second collection subframe encompasses a second plurality of light pulse cycles;

transmitting a plurality of light pulses into the field of view over the first plurality of light pulse cycles and the second plurality of light pulse cycles;

for the first collection subframe, generating first histogram data based on accumulated counts of time-referenced photon detections by the pixel during the first collection subframe in bins within a first set of bins according to a first bin map;

for the second collection subframe, generating second histogram data based on accumulated counts of time-referenced photon detections by the pixel during the second collection subframe in bins within a second set of bins according to a second bin map, wherein the second bin map exhibits shorter bin widths than the first bin map; and resolving a range to the target in the field of view in the event of the pile-up condition based on (1) data indicative of a coarse range estimate derived from the first histogram data and (2) data indicative of a range adjustment derived from the second histogram data.

20. An apparatus comprising:

a photodetector having a field of view, wherein the photodetector generates signals in response to incident light over time;

a memory comprising a plurality of bins; and a circuit that maps the signals to bins within the memory during a frame acquisition period, wherein the frame acquisition period includes a diffuse acquisition phase and a retroreflector resolution phase, wherein the diffuse acquisition phase encompasses a first plurality of light pulse cycles, wherein the retroreflector resolution phase encompasses a second plurality of light pulse cycles, wherein the circuit, for the diffuse acquisition phase, maps signals to bins within a first set of the bins according to a first map that relates the bins within the first set to time to generate first histogram data, wherein the circuit, for the retroreflector resolution phase, maps signals to bins within a second set of the bins according to a second map that relates the bins within the second set to time to generate second histogram data, wherein the second map exhibits shorter bin widths than the first map, wherein the first histogram data can be processed to detect a pile-up condition based on defined criteria, and wherein a range to an object in the field of view is resolvable in the event of the pile-up condition based on (1) data indicative of a coarse range estimate derived from the first histogram data and (2) data indicative of a range adjustment derived from the second histogram data.

* * * * *